United States Patent [19]

Sappok et al.

[11] 4,294,620

[45] Oct. 13, 1981

[54] PHTHALOCYANINE FORMULATIONS

[75] Inventors: Reinhard Sappok, Heidelberg; Joachim Kranz, Ludwigshafen, both of Fed. Rep. of Germany

[73] Assignee: BASF Aktiengesellschaft, Ludwigshafen, Fed. Rep. of Germany

[21] Appl. No.: 116,582

[22] Filed: Jan. 29, 1980

[51] Int. Cl.³ .............................................. C09B 47/08
[52] U.S. Cl. ................... 106/288 Q; 106/22; 106/308 N; 106/309; 260/314.5
[58] Field of Search ............... 106/22, 288 G, 308 N, 106/309; 260/314.5

[56] References Cited

U.S. PATENT DOCUMENTS

| | | | |
|---|---|---|---|
| 2,699,443 | 1/1955 | Eastes et al. | 260/314.5 |
| 3,560,235 | 2/1971 | Sarfas et al. | 106/308 |
| 3,728,301 | 4/1973 | Speace et al. | 260/33.6 R |
| 3,748,164 | 7/1973 | Akamatsu et al. | 106/288 Q |
| 3,849,150 | 11/1974 | Schrempp et al. | 106/288 Q |
| 4,069,064 | 1/1978 | Nett et al. | 106/193 P |

*Primary Examiner*—Lorenzo B. Hayes
*Assistant Examiner*—Amelia B. Yarbrough
*Attorney, Agent, or Firm*—Oblon, Fisher, Spivak, McClelland & Maier

[57] ABSTRACT

Phthalocyanine formulations which comprise a mixture of (a) phthalocyanine and (b) from 2 to 20% by weight, based on (a) of one or more urea derivatives of the formula K-(-NHCO-NH-R)$_2$ (I), where K is 1,5-naphthylene or 4,4'-diphenylenemethane, R is alkyl of 12 to 18 carbon atoms, alkenyl of 12 to 18 carbon atoms, 3-(alkoxy of 8 to 18 carbon atoms)-propyl, 2-(alkylamino of 8 to 18 carbon atoms)-ethyl or (CH$_2$)$_3$—O—(CH$_2$—CH$_2$O)$_n$—R$^1$, R$^1$ is alkyl of 2 to 8 carbon atoms or phenyl and n is 1, 2, 3 or 4, and which are obtained by milling (a) with (b) in the absence of a grinding medium.

When used in printing inks, such as offset printing inks, the formulations give deeply colored prints in very pure hues, with very low graininess of the ink.

10 Claims, No Drawings

PHTHALOCYANINE FORMULATIONS

The present invention relates to phthalocyanine formulations and to offset printing inks containing these formulations.

As a rule, copper phthalocyanine (CuPc) is obtained, from its synthesis, in the β-modification and in a coarsely crystalline form. Such crude CuPc is of little value for the pigmentation of printing inks, which is why crude CuPc, before use for tinctorial purposes, is converted to a pigmentary form (ie. a tinctorially useful form). For this purpose, the crude product, eg. crude CuPc or crude phthalocyanine, is dry-comminuted in suitable milling and comminuting machinery, eg. ball mills, vibratory mills, grinding mills or kneaders, in the presence of large amounts of an inorganic salt, eg. sodium chloride, sodium sulfate or calcium chloride, and in the presence or absence of a small amount of an organic fluid. The process material is then introduced into water and the pigment is separated from the salt solution by filtration, and is washed salt-free and dried.

The crude material can also be converted to the pigmentary form by first thoroughly milling crude CuPc in a ball mill or vibratory mill in the absence of a grinding medium, such as a salt, and in the absence of an organic fluid. The process material consists of agglomerates of up to 200 μm in size, essentially made up of primary particles of from 0.01 to 0.05 μm in size. The material is then introduced into an organic fluid, eg. an alcohol, ester, ether or ketone or a mixture of such fluids with water, and is recrystallized. Thereafter, the pigmentary form is isolated and dried.

The pigmentary forms of phthalocyanine obtained by either conditioning process are in the form of very fine powders with primary particles of from 0.05 to 0.1 μm in size, though these have reagglomerated on drying. To achieve optimum tinctorial properties, the agglomerates contained in the pigment powder must again be disintegrated by dispersing them in the medium in which the pigment is used, for which energy must be expended. The processes described are expensive and have the disadvantage that dilute salt solution is discharged as the effluent, and/or organic fluids are discharged into the effluent and/or emitted into the atmosphere during working up and recovery.

German Laid-Open Application DOS No. 2,132,546 discloses a process by means of which pigment pastes are obtained through direct incorporation of dry-milled crude pigment. The pigment pastes give very deeply colored printing inks which give very pure hues. However, in the case of very viscous mineral oil-containing solutions of printing ink binders, as used, for example, to prepare offset printing inks, it is necessary to heat the mixture, comprising the printing ink binder solution and the mill base, for several hours at about 70° C., and to disperse the mixture thoroughly because of the high viscosity of the binder solution.

It is an object of the present invention to provide a phthalocyanine formulation which no longer exhibits the above disadvantages, or only exhibits them to a substantially reduced degree, when used in highly viscous mineral oil-containing solutions of printing ink binders, as are for example employed in particular for offset printing.

We have found that this object is achieved and that satisfactory offset printing inks are obtained if the latter are prepared from phthalocyanine formulations which are obtained by dry milling of
 (a) phthalocyanine and
 (b) from 2 to 20% by weight, based on (a), of one or more urea derivatives of the general formula $$K-(-NHCO-NH-R)_2 \quad (I)$$

where K is 1,5-naphthylene or 4,4'-diphenylenemethane, R is alkyl of 12 to 18 carbon atoms, alkenyl of 12 to 18 carbon atoms, 3-(alkoxy of 8 to 18 carbon atoms)-propyl, 2-(alkylthio of 8 to 18 carbon atoms)-ethyl, 2-(alkylamino of 8 to 18 carbon atoms)-ethyl or $-(CH_2)_3-O-(CH_2-CH_2O)_n-R^1$, $R^1$ is alkyl of 2 to 8 carbon atoms or phenyl and n is 1, 2, 3 or 4, in the absence of a grinding medium.

Using the formulations according to the invention, blue printing inks are obtained, which for the same pigment content give deeper prints, in purer hues, than do the printing inks obtainable with the prior art pigments. Furthermore, the offset printing inks prepared with the formulations according to the invention exhibit less graininess than those prepared with prior art pigments.

The formulations according to the invention are prepared by dry milling of (a) with (b) in a ball mill, vibratory mill or similar comminuting machinery. It is immaterial whether the phthalocyanine is first milled by itself and (b) is added at a later point in time and then milled with (a), or whether a mixture of phthalocyanine and (b) is milled ab initio. Milling is carried out in the absence of a grinding medium such as sodium chloride, sodium sulfate or calcium chloride.

Simple mixing of finely milled (a) with (b) in paddle mixers or by tumbling in a drum gives a formulation which, compared to prior art formulations, shows only a slight improvement in offset printing inks.

Suitable phthalocyanines (a) are metal-free phthalocyanine and especially halogen-free or virtually halogen-free copper phthalocyanine (CuPc). The description virtually halogen-free CuPc is applied to CuPc which contains an average of not more than 0.2 halogen atom, eg. chlorine or bromine atom, per molecule of CuPc. The phthalocyanines (a) are preferably used in the form of the coarsely crystalline crude pigment.

Specific examples of suitable meanings of R in the urea derivatives of the formula I are:

(α) R=alkyl of 12 to 18 carbon atoms or alkenyl of 12 to 18 carbon atoms: dodecyl, isododecyl, tridecyl, hexadecyl, octadecyl and oleyl.

(β) R=3-(alkoxy of 8 to 18 carbon atoms)-propyl: 3-(2'-ethylhexyloxy)propyl, 3-n-octyloxypropyl, 3-nonyloxypropyl, 3-decyloxypropyl, 3-undecyloxypropyl, 3-dodecyloxypropyl, 3-tetradecyloxypropyl, 3-pentadecyloxypropyl, 3-hexadecyloxypropyl and 3-octadecyloxypropyl.

(γ) R=2-(alkylthio of 8 to 18 carbon atoms)-ethyl: 2-n-octylthioethyl, 2-decylthioethyl, 2-dodecylthioethyl, 2-tetradecylthioethyl, 2-hexadecylthioethyl and 2-octadecylthioethyl.

(δ) R=2-(alkylamino of 8 to 18 carbon atoms)-ethyl: 2-octadecylaminoethyl, 2-hexadecylaminoethyl, 2-dodecylaminoethyl, 2-decylaminoethyl and 2-octylaminoethyl.

(ε) $R=-(CH_3)_2-O-(CH_2-CH_2O)_n-R^1$, $-(CH_2)_3-O-(C_2H_4O)_1-R^1$, $-(CH_2)_3-O(C_2H_4O)_2-R^1$, $-(CH_2)_3-O-(C_2H_4O)_3-R^1$ and $-(CH_2)_3-O(C_2H_4O)_4-R^1$, where $R^1$ is, for example, ethyl, n-propyl, i-propyl, n-butyl, i-butyl, n-pentyl, n-hexyl, n-octyl, 2-ethylhexyl or phenyl.

From technological and tinctorial points of view, preferred urea derivatives of the formula I are those where K is 1,5-naphthylene or 4,4′-diphenylenemethane and R is one of the radicals listed under (α) and (β), or is —(CH$_2$)$_3$—O—(C$_2$H$_4$O)$_{n'}$—R′, where n′ is 1 or 2 and R′ is alkyl of 2 to 5 carbon atoms or phenyl.

Particularly preferred formulations are those where the urea derivative (b) has the formula

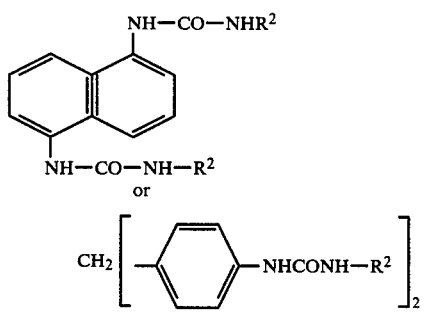

where R$^2$ is tridecyl, 3-(2′-ethylhexyloxy)-propyl or —(CH$_2$)$_3$—O—CH$_2$—CH$_2$O—(CH$_2$)$_3$CH$_3$, since such formulations give particularly advantageous printing inks in respect of tinctorial strength, purity of hue and fine dispersion of the pigment.

The amount of the urea derivative or derivatives (b) is at least 2% by weight, based on (a). The upper limit is about 20% by weight, based on (a). Even larger amounts of (b) can be used, but do not result in any additional advantages.

Preferably, the proportion of (b) is from 5 to 15, especially from 7 to 12, % by weight, based on (a).

The compounds of the general formula I are prepared by reacting the corresponding isocyanates with 2 moles of an amine of the general formula R—NH$_2$, where R has the above meanings, by conventional methods. If a mixture of different amines is used for the reaction, a mixture of products is obtained.

The Examples which follow illustrate the invention. Percentages are by weight.

EXAMPLE 1

(a) Formulation: 4.5 kg of chlorine-free crude copper phthalocyanine (β-modification) and 0.5 kg of

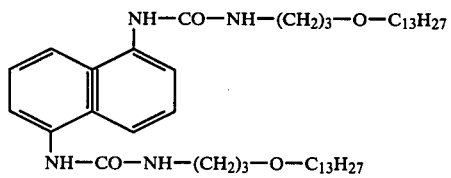

are introduced into a ball mill (50 liters capacity, and containing 50 kg of iron balls of 2–3 cm diameter) and are milled for 25 hours at 25° C. In the resulting milled material, 65% of the CuPc is in the α-modification. The material is in the form of agglomerates of from 0.5 to about 200 μm in size, composed of primary particles of from 0.01 to 0.05 μm in size.

(b) Comparative pigment: the same crude CuPc was milled as described in (a), but in the absence of the urea derivative.

(c) Tinctorial test (offset printing ink)

(α) Full-shade paste 15 g of pigment (a) or (b) were dispersed for 15 minutes in 135 g of an offset printing ink varnish which contains a phenol-modified rosin dissolved in mineral oil and has a viscosity of 1.97 Pa.s, by treatment in a dissolver having a disc of 30 mm diameter running at 6,000 rpm. A sample (sample 1) was taken. Dispersing was then continued for 15 minutes at 12,000 rpm followed by 15 minutes at 18,000 rpm, and after both treatments a sample was taken (sample 2 and sample 3 respectively). The dispersion thus obtained was then further milled on a triple roll mill, under a roll pressure of 60 bar, in one passage and in 3 passages, a sample being taken after each treatment (sample 4 and sample 5 respectively).

(β) White reduction

A white reduction was prepared from each sample which was taken after each of the milling stages described under (α), by the following method: 10 g of a standard white paste (containing 30% of titanium dioxide) were mixed with 0.4 g of the full-shade paste obtained as described in c (α) on a muller with 4×35 revolutions, under 50 kg load.

(γ) The inks obtained were knife-coated, at a thickness of 100 μm, onto board, and were dried. The resulting colorations (depth of shade: 1/25 standard depth=1/25 SD) were evaluated colorimetrically by the FIAF method (Dr. L. Gall, Farbe+Lack, 75 (Sept. 1969), 854–862.

Results:

TABLE 1a

| Sample | Color equivalent Pigment (a) | Tinctorial strength[+] of the coloration with Pigment (b) (comparison) |
|---|---|---|
| 1 | 160 | 422 |
| 2 | 130 | 345 |
| 3 | 116 | 260 |
| 4 | 104 | 155 |
| 5 | 100 | 138 |

[+]The tinctorial strength was expressed as the color equivalent (CE), taking sample (5a) as 100.

The Table clearly shows the substantially improved dispersibility of the CuPc formulation according to the invention.

TABLE 1b

| Tinctorial characteristics of the white reductions (1/25 SD) obtained with samples 5 | | | | |
|---|---|---|---|---|
| | AV | CE | H | S |
| Comparative pigment b | 9.06 | 138 | 18.05 | 4.09 |
| Pigment from a | 12.57 | 100 | 17.94 | 4.24 |

AV = parts of white pigment required to achieve the stated depth of shade (1/25 SD) in the mixture.
CE = color equivalent. 100 parts of pigment sample 5a correspond in tinctorial strength to the stated amount of the comparative pigment.
H = hue
S = color saturation The tinctorial characteristics are stated in CIE measurements according to DIN 6,164 (type C standard light). A difference of 0.04 unit in either H or S is clearly detectable to the person carrying out the experiment. In the case of H, a larger numerical value in the present instance means that the hue is greener and a lower numerical value that the hue is redder than with the comparative pigment. In the case of S, a larger numerical value means that the hue is purer.

EXAMPLES 2 TO 16

The procedure followed was as described in Example 1, but using, instead of the stated urea derivative, those of the formula

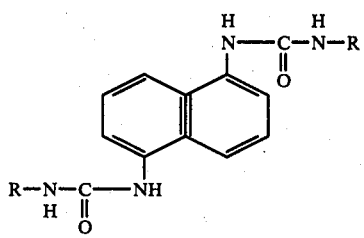

The amounts of crude CuPc and of urea derivative used, and the meanings of R, are shown in the Table which follows.

| Example | R | Amount [kg] Urea derivative | Amount [kg] Crude CuPc |
|---|---|---|---|
| 2 | $-(CH_2)_3-CH_2-CH\begin{smallmatrix}C_2H_5\\C_4H_9\end{smallmatrix}$ | 0.4 | 4.6 |
| 3 | $-C_{13}H_{27}$ | 0.3 | 4.7 |
| 4 | $-C_{18}H_{37}$ | 0.3 | 4.7 |
| 5 | $-(CH_2)_3-O-C_{16-19}H_{33-39}^{(x)}$ | 0.5 | 4.5 |
| 6 | $-(CH_2)_3-O-C_{9-11}H_{19-23}^{(x)}$ | 0.7 | 4.3 |
| 7 | $-(CH_2)_3-O-C_8H_{17}$ | 0.7 | 4.3 |
| 8 | $-CH_2-CH_2-O-C_4H_9$ | 0.7 | 4.3 |
| 9 | $-(CH_2-CH_2-O)_2-\text{Ph}$ | 0.5 | 4.5 |
| 10 | $-(CH_2)_3-NH-C_{18}H_{37}$ | 0.6 | 4.4 |
| 11 | $-(CH_2)_2-S-C_8H_{17}$ | 0.7 | 4.3 |
| 12 | $-(CH_2)_2-S-C_{12}H_{17}$ | 0.5 | 4.5 |
| 13 | $-(CH_2)_2-S-C_{18}H_{37}$ | 0.6 | 4.4 |
| 14 | $-(CH_2)_2-NH-C_{16}H_{33}$ | 0.7 | 4.3 |
| 15 | $-(CH_2)_2-NH-C_{12}H_{35}$ | 0.6 | 4.4 |
| 16 | $-(CH_2)_2-NH-C_8H_{17}$ | 0.7 | 4.3 |

$(x)$Mixtures

In every case, similar improvements over the comparative pigment of Example 1(b) were achieved. The dispersibility and tinctorial strength were substantially improved relative to the comparative pigment, and the graininess was substantially reduced.

EXAMPLE 17

(a) 270 kg of chlorine-free crude copper phthalocyanine (β-modification) and 30 kg of the urea derivative of the formula

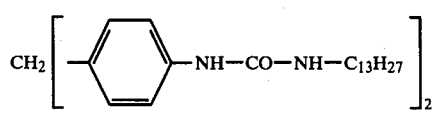

were milled for 25 hours at 80° C. in a ball mill of 2.5 m³ capacity, containing 2,325 kg of iron balls of 2-3 cm diameter. The milled material had the same properties as that obtained according to Example 1a.

(b) The comparative pigment was prepared as described in (a), but in the absence of the urea derivative.

(c) The tinctorial tests were carried out as described in Example 1(c), except that in c (α) a varnish of similar chemical structure but having a viscosity of 22.9 Pa.s was used.

The full-shade pastes were prepared by dispersing in a dissolver at 18,000 rpm for 15 minutes (sample 1) and then dispersing on a roll mill under a pressure of 60 bar, with 1 passage or 3 passages (samples 2 and 3 respectively).

Thereafter the test was carried out as described in Example 1(c) under (β) and (γ).

Results:

| Sample | Color equivalent[+] of the coloration with Pigment (a) | Color equivalent[+] of the coloration with Pigment (b) |
|---|---|---|
| 1 | 434 | 527 |
| 2 | 169 | 317 |
| 3 | 100 | 172 |

[+]The tinctorial strength was expressed as the color equivalent (CE) taking pigment (a), sample 3, as 100.

The comparison clearly shows the greater dispersibility of the formulation according to the invention.

The white reductions obtained with samples 3 were evaluated colorimetrically by the FIAF method. The results are summarized in Table 2.

TABLE 2

Tinctorial characteristics of the white reductions obtained with samples 3.

| | AV | CE | H | S |
|---|---|---|---|---|
| Comparative pigment 17 (b), sample 3 | 5.56 | 172 | 18.22 | 4.04 |
| Pigment from 17 (a), sample 3 | 9.56 | 100 | 18.12 | 4.21 |

For the meanings of AV, CE, H and S, see the footnote to Table 1, Example 1 (c).

EXAMPLES 18 TO 26

(a) The procedure followed was as described in Example 17, but using, instead of the urea derivative described there, those of the formula

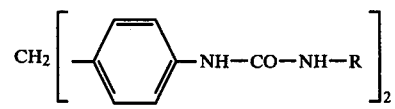

The meanings of R and the amounts of crude CuPc and urea derivative are shown in the Table which follows.

| Example | R | Amounts [kg] Urea derivative | Amounts [kg] Crude CuPc |
|---|---|---|---|
| 18 | $-(CH_2)-O-C_{13}H_{27}$ | 30 | 270 |
| 19 | $-(CH_2)_3-O-C_8H_{17}(n)$ | 30 | 270 |
| 20 | $-(CH_2)_3-O-(CH_2-CH_2-O)_2-C_4H_9$ | 50 | 250 |
| 21 | $-(CH_2)_2-NH-C_8H_{17}(n)$ | 40 | 260 |
| 22 | $-(CH_2)_2-NH-C_{12}H_{25}$ | 30 | 270 |
| 23 | $-(CH_2)_2-NH-C_{18}H_{37}$ | 50 | 250 |
| 24 | $-(CH_2)_2-S-C_{12}H_{25}$ | 50 | 250 |
| 25 | $-(CH_2)_2-S-C_8H_{17}$ | 50 | 250 |
| 26 | $-(CH_2)_2-S-C_{18}H_{37}$ | 40 | 270 |

All the milled products showed improvements in dispersibility, tinctorial strength and graininess over the comparative pigment obtained according to Example 17(b).

EXAMPLE 27

(a) Formulation: The procedure followed was as described in Example 1(a), except that the crude CuPc was replaced by the same amount of crude metal-free phthalocyanine. The resulting formulation consisted of agglomerates of up to 200 μm in size, composed of primary particles of from 0.01 to 0.05 μm in size.

(b) The comparative pigment was prepared as described in Example 1(b), but here again the CuPc was replaced by crude metal-free phthalocyanine.

(c) The tinctorial test was carried out as described in Example 1(c). White reductions were prepared as described in Example 1(cβ) from the full-shade pastes obtained by milling in a dissolver and on a triple-roll mill (3 passages under 60 bar roll pressure) and the colorations obtained therewith were evaluated colorimetrically. The results are summarized in Table 3.

TABLE 3

Tinctorial characteristics of the white reductions

| | AV | CE | H | S |
|---|---|---|---|---|
| Comparative pigment 27 (b) | 6.70 | 161.0 | 18.61 | 4.08 |
| Pigment from 27 (a) | 10.81 | 100.0 | 18.52 | 4.29 |

For the meanings of AV, CE, H and S, see the footnote to Table 1, Example 1(c).

We claim:

1. A pigmentary phthalocyanine formulation, prepared by a process comprising:
   dry milling (a) a crude phthalocyanine with (b) from 2 to 20% by weight, based on (a), of at least one urea derivative of the formula:

K—(—NHCO—NH—R)$_2$   (I)

where K is 1,5-naphthylene or 4,4'-diphenylenemethane; R is alkyl of 12 to 18 carbon atoms, alkenyl of 12 to 18 carbon atoms, 3-(alkoxy of 8 to 18 carbon atoms)-propyl, 2-(alkylthio of 8 to 18 carbon atoms)-ethyl, 2-(alkylamino of 8 to 18 carbon atoms)-ethyl or —(CH$_2$)$_3$—O—(CH$_2$CH$_2$O)$_n$—R$^1$, wherein R$^1$ is alkyl of 2 to 8 carbon atoms or phenyl; and n is a integer of 1 to 4, in the absence of a grinding medium.

2. The formulation as claimed in claim 9, wherein the phthalocyanine used is crude metal-free phthalocyanine, crude chlorine-free copper phthalocyanine or crude copper phthalocyanine which contains an average of not more than 0.2 halogen atom per molecule.

3. The formulation as claimed in claim 1 or 2, wherein the content of (b) is from 5 to 15% by weight, based on (a).

4. The formulation as claimed in claim 1 or 2, wherein the content of (b) is from 7 to 12% by weight, based on (a).

5. A pigmentary phthalocyanine formulation prepared by a process comprising: dry milling
   (a) crude metal-free phthalocyanine, crude chlorine-free copper phthalocyanine or crude copper phthalocyanine which contains an average of not more than 0.2 halogen atom per molecule with
   (b) from 2 to 20% by weight, based on (a), of at least one urea derivative of the formula:

K—(—NHCO—NH—R)$_2$ wherein K is 1,5-naphthylene or 4,4'-diphenylenemethane; R is alkyl of 12–18 carbon atoms, alkenyl of 12–18 carbon atoms, 3-(alkoxy of 8–18 carbon atoms)-propyl or —(CH$_2$)$_3$—O—(C$_2$H$_4$)$_{n'}$, —R', wherein R' is alkyl of 2–5 carbon atoms or phenyl and n is 1 or 2, in the absence of a grinding medium.

6. The formulation as claimed in claim 5, wherein group R of said urea derivative is —C$_{13}$H$_{27}$, —(CH$_2$)$_3$—O—CH$_2$—CH—(CH$_2$)$_3$CH$_3$
   $\phantom{XXXXXXXXXXXXXXXXXXXXX}$|
   $\phantom{XXXXXXXXXXXXXXXXXXXXX}$C$_2$H$_5$ or

—CH$_2$)$_3$—O—CH$_2$—CH$_2$ O—CH$_2$)$_3$CH$_3$.

7. The formulation as claimed in claim 5 or 6, wherein the content of (b) is from 5 to 15% by weight, based on (a).

8. The formulation as claimed in claim 5 or 6, wherein the content of (b) is from 7 to 12% by weight, based on (a).

9. The formulation as claimed in claim 1, wherein said alkyl of 12–18 carbon atoms is dodecyl, isododecyl, tridecyl, hexadecyl or octadecyl and said alkenyl of 12 to 18 carbon atoms is oleyl.

10. The formulation as claimed in claim 1, wherein said 3-(alkoxy of 8–18 carbon atoms)-propyl is 3-(2'-ethylhexyloxy)-propyl, 3-n octyloxylpropyl, 3-nonyloxypropyl, 3-decyloxypropyl, 3-undecyloxypropyl, 3-dodecyloxypropyl, 3-tetradecyloxypropyl, 3-pentedecyloxypropyl, 3-hexadecyloxypropyl or 3-octadecyloxypropyl; said 2-(alkylthio of 8–18 carbon atoms)-ethyl is 2-n-octylthioethyl, 2-decylthioethyl, 2-dodecylthioethyl, 2-tetradecylthioethyl, 2-hexadecylthioethyl or 2-octadecylthioethyl and said 2-(alkylamino of 8–18 carbon atoms)-ethyl is 2-octadecylaminoethyl, 2-hexadecylaminoethyl, 2-dodecylaminoethyl, 2-decylaminoethyl or 2-octylaminoethyl.

* * * * *

UNITED STATES PATENT AND TRADEMARK OFFICE
CERTIFICATE OF CORRECTION

PATENT NO. : 4,294,620
DATED : Oct. 13, 1981
INVENTOR(S) : REINHARD SAPPOK ET AL

It is certified that error appears in the above-identified patent and that said Letters Patent are hereby corrected as shown below:

On the title page Insert:

[30]---Foreign Application Priority Data

Feb. 17, 1979 [DE]  Fed. Rep. of Germany....2906157 __.

Signed and Sealed this

Nineteenth Day of January 1982

[SEAL]

Attest:

GERALD J. MOSSINGHOFF

Attesting Officer — Commissioner of Patents and Trademarks